Figure 1A:
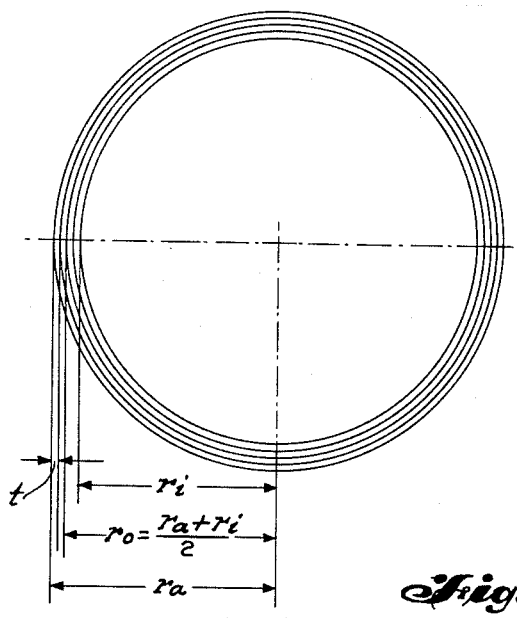
Figure 1B:
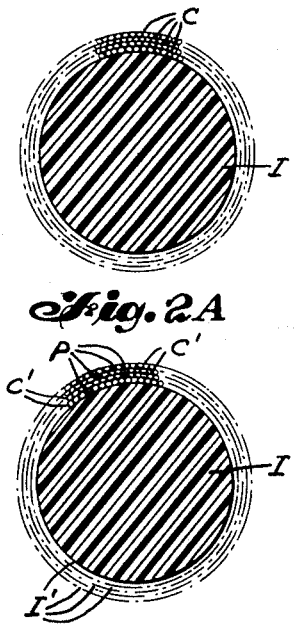
Figure 2A:
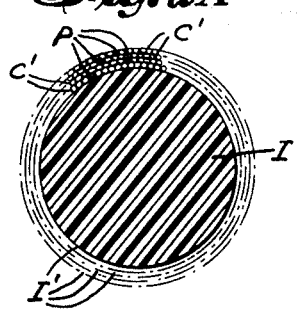

Dec. 29, 1964　　　MASAO SUGI ETAL　　　3,163,836
COAXIAL CONDUCTOR HAVING PARALLEL CONNECTED STRANDED
LAYERS OF DIFFERENT PITCH FOR EQUALIZING
INDUCTANCE AND CURRENT DISTRIBUTION
Original Filed April 6, 1953　　　　　　　3 Sheets-Sheet 1

INVENTORS.
MASAO SUGI
BY KAORU MURAI

ATTORNEY

INVENTORS.
MASAO SUGI
KAORU MURAI
BY
ATTORNEY

INVENTORS.
MASAO SUGI
KAORU MURAI
BY
ATTORNEY

United States Patent Office 3,163,836
Patented Dec. 29, 1964

3,163,836
COAXIAL CONDUCTOR HAVING PARALLEL CONNECTED STRANDED LAYERS OF DIFFERENT PITCH FOR EQUALIZING INDUCTANCE AND CURRENT DISTRIBUTION
Masao Sugi, Osaka-fu, and Kaoru Murai, Hyogo-ken, Japan, assignors to Sumitomo Electric Industries, Ltd., Konohana-ku, Osaka, Japan
Continuation of abandoned application Ser. No. 347,052, Apr. 6, 1953. This application Jan. 13, 1961, Ser. No. 82,592
Claims priority, application Japan, Apr. 14, 1952, 27/5,746
21 Claims. (Cl. 333—96)

This invention relates to electric conductors for high frequency currents. This application is a continuation of application Serial No. 347,052, filed April 6, 1953, now abandoned.

When current flows in a conductor a magnetic field is set up inside the conductor as well as externally of the conductor. If the current is an alternating one the internal magnetic field induces a voltage inside the conductor which opposes the applied voltage and becomes larger as the center of the conductor is approached, whereas if the current is a direct current or a low frequency alternating current it is approximately evenly distributed over the cross-section of the conductor. As a result of the phenomenon referred to, high frequency current is forced to distribute itself so that the greater proportion flows near the surface and less near the center. This is known as "skin effect."

Skin effect is negligible at low frequencies but increases with increasing frequency to such a degree that at high frequencies the major portion of the current flows near the surface. Since little current flows in the interior of the conductor at high frequencies the effect is the same as though the current were flowing in a thin conducting tube. This is equivalent to reducing the cross-section or area of the conductor which increases its resistance. Consequently skin effect increases the resistance of a solid conductor to high frequency current as compared to its value for direct current and low frequency alternating current.

The invention relates more particularly to stranded high frequency electric conductors for high frequencies for use as communication cable conductors, lead-in conductors for communication apparatus, high frequency electric furnace conductors, etc., and its object is to minimize the skin effect of electric currents in such cables as conductors.

According to the invention the elemental conductors or wires constituting the cable or conductor are arranged in layers insulated one from another and comprising one or more elemental wires or tapes or strips, the pitch of the wires or tapes or strips in the respective layers being so chosen as to minimize the skin effect. The elemental conductors are stranded into hollow or solid form and where two or more elemental conductors are used to form a layer, at least two adjacent ones of the elemental conductors forming the layer have an insulating means between them. Where a single elemental conductor is used to form a layer, some insulating means is provided along the line of contact between the meeting edges. By this means the current is caused to follow a spiral path in the stranded conductor thereby increasing the effective inductance due to the electric current component in the direction of the circumference.

According to a further feature of our invention, the stranding pitch of the wires or tapes or strips of each layer is so chosen that the effective inductance of each part of the stranded conductor caused by self-inductance and mutual inductance, is as nearly equal as possible, in order that the high frequency current in each layer will have substantially the same density.

In the accompanying drawings, FIGS. 1 to 8, respectively, illustrate the perspective views and FIGS. 1B and 2A through 8A show sectional views of eight embodiments of our invention and FIG. 1A is a diagrammatic view illustrating the relative dimensions of a typical cable according to the invention.

Figure 3:
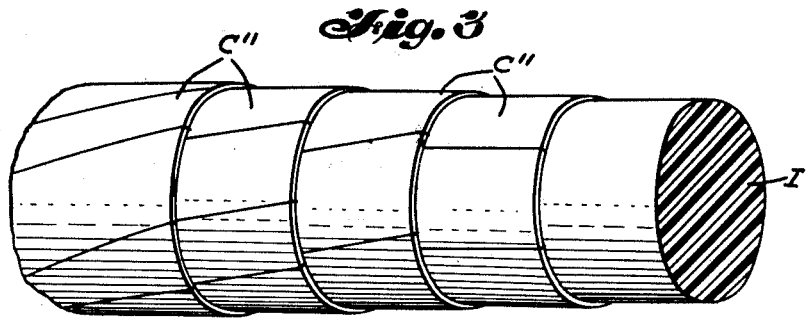
Figure 4:
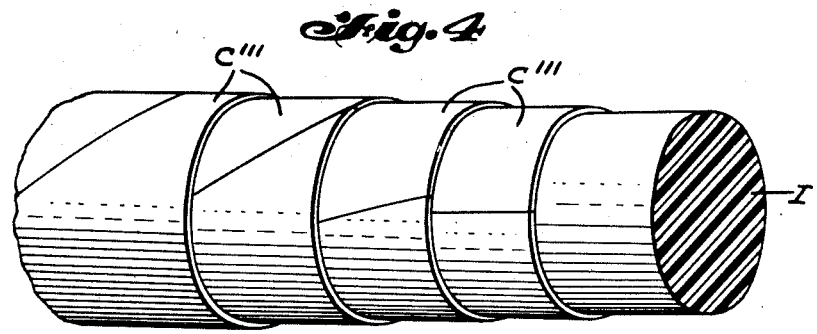

The following analysis shows how an approximate value for the pitch may be calculated for a stranded conductor, as illustrated in FIG. 3 or FIG. 4.

Assuming thickness of elemental strip conductor; $t$ (unit, mm.),
Number of layers; $n$,
Equivalent thickness due to skin effect or skin depth of a massive conductor:

$$\theta = \frac{5}{\pi}\sqrt{\frac{\rho}{f}}$$

Note:

$\rho$: Resistivity (unit, $\mu\Omega$ cm.)
$f$: Frequency (unit, kc.)
$\theta$ is shown by unit, mm.

And under the following condition that:

$$t\frac{0.7\theta}{\sqrt{n}} < \quad nt \ll r_0$$

Note:

"$r_0$" shows average radius of the composite of conductors and intermediate insulation.

With the above assumption, the under-mentioned pitch (P) will be effective in carrying out our invention:
Note:
Intervals between layers are not taken into consideration.

$P_1 = \infty$ (inner-most layer)

$P_2 = 2\pi\sqrt{\dfrac{r_0^3}{3t}}\dfrac{\sqrt{n(n^2-1)}}{2}$ (the second layer from inside)

$P_3 = 2\pi\sqrt{\dfrac{r_0^3}{3t}}\dfrac{\sqrt{n(n^2-1)}}{6}$ (the third layer from inside)

$P_m = 2\pi\sqrt{\dfrac{r_0^3}{3t}}\dfrac{\sqrt{n(n^2-1)}}{m(m-1)}$ (the "$m$" layer from inside)

$P_n = 2\pi\sqrt{\dfrac{r_0^3}{3t}}\sqrt{\dfrac{n+1}{n(n-1)}}$ (outer-most layer)

The condition $$t < \frac{0.7\vartheta}{\sqrt{n}}$$

is for the purpose of obtaining a better approximation. However, it is not restricting the effectiveness of the conductors designed in accordance with these equations. It is possible for practical purposes to make design utilizing the said equations in excess of this limitation and thereby effectively reduce skin effect. It will be appreciated that since the average radius $r_0$ is very much greater than the total thickness of all of the layers the variation in pitch for any one layer such as $P_m$ with respect to the next adjacent layer is related approximately to the inverse proportion of the square of the distance from the innermost layer of the stranded conductor. As shown above, the selection of the stranding pitch is so made that the further toward the outer layer the smaller the pitch is. In other words, the number of turns per unit of length, or the converse of the pitch number, is added to the first layer for forming the second layer, and increases progressively in the additional layers towards the outer layer. Moreover, as indicated in the above example, the rate of such increase is made more rapid the further one progresses towards the outer layers. In the above example, the turns number of the first layer was taken at 0 (zero), but it is also possible to take this at a positive or a plus value and progressively increase it on the second layer and so on. Also, it is possible to take the turns number of the first layer at a negative or minus (reverse) value and increase it for the second layer and so on (decrease of minus value) and change it to positive or plus as layers are added and to go on increasing it.

Generally, the effective resistance of such an electric conductor will become approximately $$\frac{1}{\sqrt{3}} \frac{t}{\vartheta} \Big/ \tanh \left\{ \frac{n}{\sqrt{3}} \left( \frac{t}{\vartheta} \right)^2 \right\}$$

times the effective resistance of a completely solid conductor if $r_0 \gg \vartheta$, $t/\vartheta < 0.6$ is assumed. For example, it will become 40% of the case of a completely solid conductor if $t/\vartheta = 0.5$ and $n=6$ is assumed.

Figure 1:
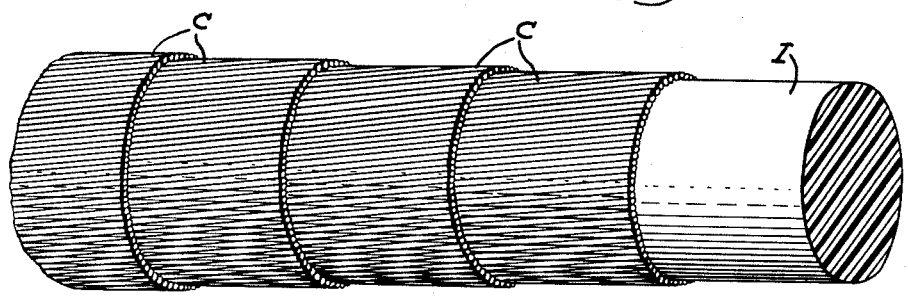

FIG. 1 illustrates an example of a stranded electric conductor comprising insulated wires of circular cross-section. A central core I of plastic insulating material is surrounded by a layer consisting of 12 strands of insulated or enamelled wire C of circular cross-section. Over this first layer are stranded in turn 18, 24 and 30 similar insulated wires, the whole forming four layers of stranded wire. The stranding pitch of the wires constituting the four layers is made progressively smaller towards the outside of the conductor. By this means, since the magnetic field in the direction of the axis of the conductor due to currents flowing in a circumferential direction in the wires is increased towards the outer layer, the effective inductance of each layer is equalized as far as possible.

Figure 2:
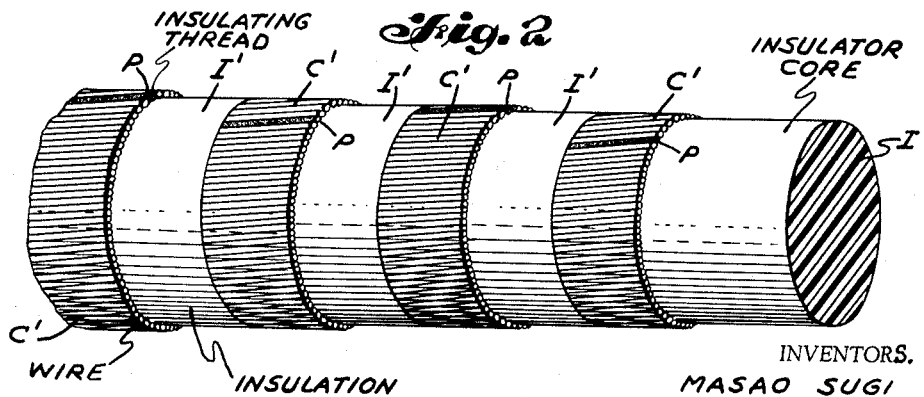

In the conductor of FIG. 2, the wires C' constituting the four layers around the insulating core I consist of bare wires of circular cross-section. Each layer also includes one thread P of plastic insulating material and between each layer of wires there is disposed a layer I' of plastic insulating material. As in the case in the conductor of FIG. 1, the pitch of the wires constituting the four layers is made progressively smaller towards the outside of the conductor.

Referring to the modified form of conductor shown in FIG. 3, in this construction the elemental wires are formed as insulated strips C'' stranded lengthwise in four layers over a central core I of insulating material. The stranding pitch of the strips constituting the respective layers is made progressively smaller towards the outside layer.

In the conductor shown in FIG. 4, the innermost layer is formed of a single piece of wide insulation-covered conductor tape or strip C''' folded lengthwise in the form of a cylinder over the plastic center core I of insulating material. The second layer, consisting of a single piece of the same conductor tape, is applied over the first layer with a slight spiral pitch. Two or more further layers are applied with progressively shorter pitch.

If bare conductor tapes are used in the construction of FIG. 4, insulating layers are provided between each two conductor layers and the tapes are applied in such manner that a small gap or space is formed at the adjacent edges of the tape on each layer.

Figure 5:
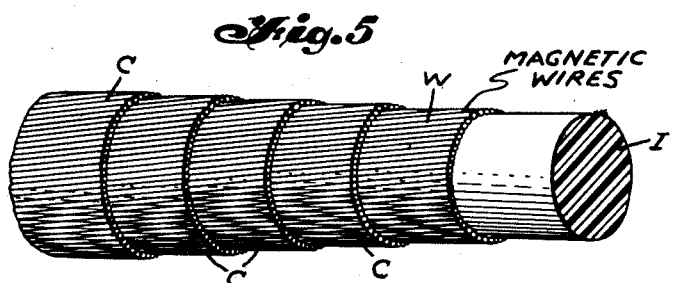
Figures 3A, 4A, 5A:
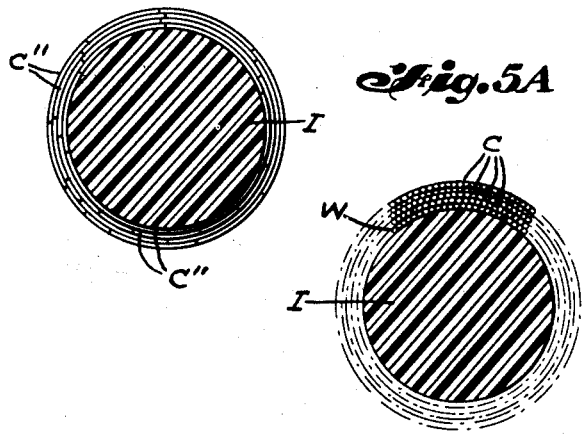

Referring now to FIG. 5, this shows a stranded conductor formed of layers of insulated wire of circular cross-section as in FIG. 1, but between the center core I of insulating material and the innermost layer there is interposed a layer of thin stranded insulated wire W of magnetic material having very small hysteresis and eddy-current losses.

In this embodiment of our invention, the increase of the resistance of the elemental wires for high frequency current due to stranding is minimized by making the stranding pitch longer, by placing at the center of the conductor a layer of magnetic material having low loss and by increasing the effect of the spiral currents in the insulated wires of each layer.

Figure 6:
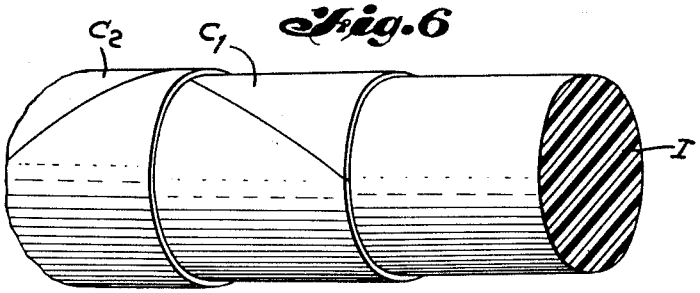

FIG. 6 is an embodiment of a stranded conductor formed with only two layers both of which are given the same or approximately the same pitch but in opposite or reversed directions. Each layer is formed of a wide insulation-covered tape $C_1$, $C_2$ and as will be seen from the drawing the pitch of one is reversed with respect to the other.

In this embodiment the self-inductances of the inner and outer layers due to the axial magnetic field set up by circumferential currents, are made to have substantially the same positive value, and the mutual inductance of the inner and outer layers is made to have a negative value which is substantially the same as the before-mentioned positive value. Thus by diminishing the influence of the differences in the effective inductance of each portion of the inner and outer layers in the case where a circumferential magnetic field only exists, the current will flow through the inner and outer layers with equal density.

Figure 7:
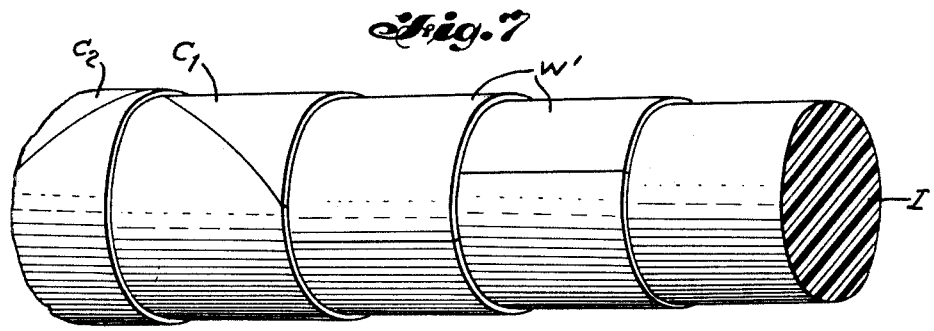

FIG. 7 illustrates a stranded conductor similar to that of FIG. 6 but in this case two wide pieces of tape W' of magnetic material having low hysteresis and eddy-current losses are interposed between the plastic insulation core I and the inner conductor layer $C_1$. The magnetic tapes W are separated by insulation and are each applied so as to have a longitudinally-running gap between their adjacent edges.

This embodiment employs the same principle as that of FIG. 6, but by the interposition of the magnetic tapes W equal results are obtained with longer pitches of the conductive layers $C_1$, $C_2$ and thus the increase in resistance to high frequency currents caused by stranding is diminished.

In all the described embodiments the size (diameter or thickness) of the elemental wires or strips may be varied as between the various layers. It will be added that the stranded conductor in the solid form is less effective than such conductor in an appropriate hollow form. Moreover in all the preceding embodiments, the case has been dealt with in which the high frequency current concentrates on the external surface of the wires or conductors by skin effects. The invention, however, is also applicable in the reserve case where the high frequency current concentrates on the inner surface of a conductor, as in the external conductor of a coaxial cable.

Figure 8:
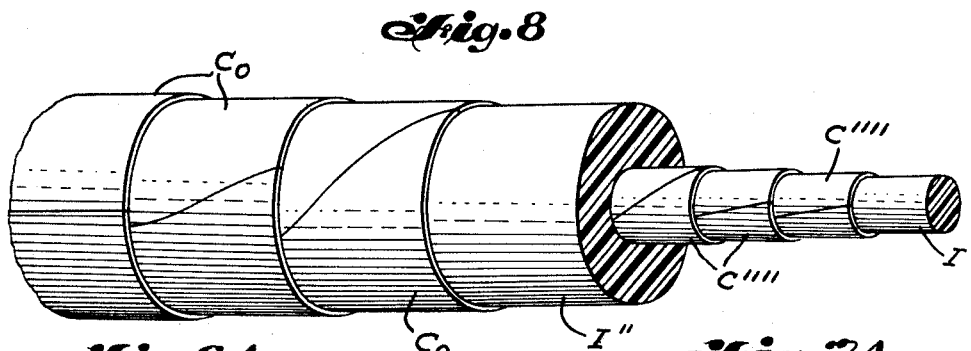
Figures 6A, 8A:
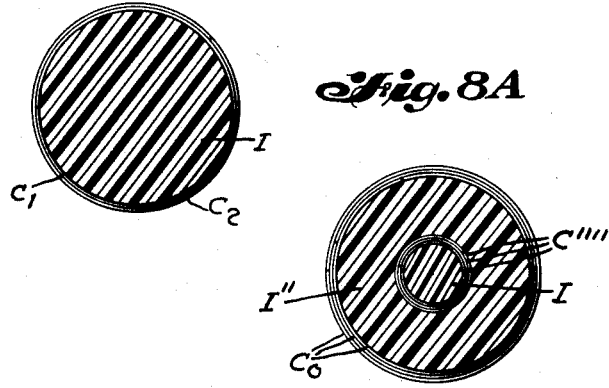
Figure 7A:
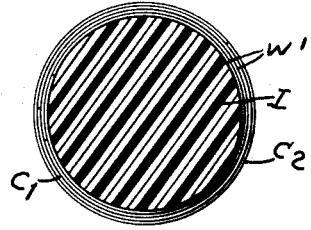

FIG. 8 shows the application of the invention to a coaxial cable in which the high frequency current is concentrated on the external surface of the inner conductor and on the internal surface of the outer conductor. The inner conductor is formed of several layers of insulated conductor tape C'''' with progressively decreasing pitch wound on the central core I. The outermost layer C'''' is covered with a sheath I'' of polyethylene over which is formed the outer conductor constituted by a plurality of layers $C_0$ of insulated conductor tape applied with a pitch which is made progressively larger towards the outside. As shown, the tapes forming the layers of the inner and outer conductors are wound in the same direction, but they may if desired be wound with opposite pitch in the manner described with reference to FIG. 6.

Given below are the experimental results obtained with an electric conductor according to our invention.

The electric conductors used in these experiments were constructed according to the embodiments of FIGS. 4, 6 and 7, and the results are indicated in Tables 1, 2 and 3, respectively.

Table 1

(a) Sample (see FIG. 4):

| Sample | A | B | C |
|---|---|---|---|
| External diameter (mm.) | 14.26 | 14.26 | 14.26. |
| Thickness of copper tape (mm.): | | | |
| First layer (Internal) | 0.17 | 0.17 | Perfect solid conductor. |
| Second layer (External) | 0.15 | 0.15 | |
| Pitch (mm.): | | | |
| First layer (Internal) | ∞ | ∞ | |
| Second layer (External) | 170 | ∞ | |
| Space between layers (mm.) (approximately). | 0.07 | 0.07 | |
| Space at the place of contact or meeting edge of copper tape (mm.) (approximately). | 1.0 | 1.0 | |

NOTE.—"B" was tested for the purpose of comparison with "A".

(b) Effective resistance:

| Frequency (kc.) | Effective resistance, Ω/km. | | | A/C |
|---|---|---|---|---|
| | A | B | C | |
| D.C. | 1.355 | 1.305 | 0.1078 | 12.58 |
| 10 | 1.365 | 1.315 | 0.608 | 2.24 |
| 20 | 1.370 | 1.360 | 0.851 | 1.61 |
| 40 | 1.400 | 1.495 | 1.190 | 1.175 |
| 60 | 1.455 | 1.665 | 1.450 | 1.003 |
| 80 | 1.485 | 1.860 | 1.672 | 0.888 |
| 100 | 1.545 | 2.060 | 1.866 | 0.828 |
| 120 | 1.615 | 2.270 | 2.042 | 0.791 |
| 130 | 1.655 | 2.355 | 2.123 | 0.780 |

NOTE.—A, B=actual figure. C=calculated figure.

Table 2

(a) Sample (see FIG. 4):

| Sample | A′ | C′ |
|---|---|---|
| External diameter (mm.) | 14.74 | 14.74. |
| Thickness of copper tape (mm.): | | |
| First layer (Internal) | 0.20 | |
| Second layer (Middle) | 0.15 | Perfect solid conductor. |
| Third layer (External) | 0.10 | |
| Pitch (mm.): | | |
| First layer (Internal) | ∞ | |
| Second layer (Middle) | 275 | |
| Third layer (External) | 110 | |
| Space between layers (mm.) (approximately). | 0.07 | |
| Space at place of contact or the meeting edge of copper tape (mm.) (approximately). | 1.0 | |

(b) Effective resistance:

| Frequency (kc.) | Effective resistance, Ω/km. | | A′/C′ |
|---|---|---|---|
| | A′ | C′ | |
| D.C. | 0.912 | 0.1008 | 9.05 |
| 10 | 0.915 | 0.588 | 1.65 |
| 20 | 0.920 | 0.821 | 1.13 |
| 40 | 1.000 | 1.150 | 0.870 |
| 60 | 1.070 | 1.402 | 0.763 |
| 80 | 1.140 | 1.616 | 0.705 |
| 100 | 1.215 | 1.804 | 0.673 |
| 120 | 1.285 | 1.935 | 0.664 |
| 130 | 1.325 | 2.053 | 0.645 |

NOTE.—A′=actual figure. C′=calculated figure.

Table 3

(a) Sample (see FIGS. 6 and 7):

| Sample | A″1 | A″2 | B″ | C″ |
|---|---|---|---|---|
| External diameter (mm.) | 10.34 | 10.34 | 10.34 | 10.34. |
| Thickness of copper tape (mm.): | | | | |
| First layer (Internal) | 0.15 | 0.15 | 0.15 | Perfect solid conductor. |
| Second layer (External) | 0.15 | 0.15 | 0.15 | |
| Pitch (mm.): | | | | |
| First layer (Internal) | 140 Right | 180 Right | ∞ | |
| Second layer (External) | 140 Left | 180 Left | ∞ | |
| Mild steel tape (mm.) | | Thick. 0.1 Width 30 | | |
| Space between layers (mm.) (approximately). | 0.07 | 0.07 | 0.07 | |
| Space at the place of contact or meeting edge of copper tape (mm.) (approximately). | 1.0 | 1.0 | 1.0 | |

NOTE.—B″ has been tested for the purpose of comparing with A″1 and A″2.

(b) Effective resistance:

| Frequency (kc.) | Effective resistance, Ω/km. | | | | A″1/C″ | A″2/C″ |
|---|---|---|---|---|---|---|
| | A″1 | A″2 | B″ | C″ | | |
| D.C. | 1.985 | 1.940 | 1.850 | 0.2052 | 9.68 | 9.45 |
| 10 | 1.995 | 1.950 | 1.865 | 0.854 | 2.34 | 2.28 |
| 20 | 2.050 | 1.965 | 1.915 | 1.185 | 1.73 | 1.66 |
| 40 | 2.160 | 2.055 | 2.105 | 1.657 | 1.305 | 1.240 |
| 60 | 2.255 | 2.140 | 2.300 | 2.018 | 1.115 | 1.060 |
| 80 | 2.335 | 2.220 | 2.515 | 2.321 | 1.006 | 1.956 |
| 100 | 2.380 | 2.300 | 2.740 | 2.590 | 0.919 | 0.888 |
| 120 | 2.435 | 2.395 | 2.970 | 2.832 | 0.860 | 0.846 |
| 130 | 2.460 | 2.450 | 3.080 | 2.945 | 0.835 | 0.832 |

NOTE.—A″1, A″2, B″=actual figure. C″=calculated figure.

As is indicated by the above tables, the electric conductor according to our invention has a smaller effective resistance value for high frequency current as compared with an ordinary perfectly solid type of conductor, or an ordinary hollow type conductor, and the diameter of our conductor for the same effective resistance value is smaller than that of an ordinary type conductor.

It will be noted that the variation in pitch of the conductors counting from the inner conductor outwardly, as used in the specification and claims, means that the counting is from the inside where the return conductor is always considered as being outward. Accordingly, when the return conductor is the center conductor of the coaxial cable, this return conductor may be considered as being outward from the inner surface of the surrounding conductor.

It must also be noted that helical conductors, as used in the claims, are inclusive of conductors whose pitch of stranding is infinite.

What is claimed is:

1. A high frequency stranded conductor comprising a central core of insulating material, a plurality of concentric layers of helical elemental conductors forming a composite of layers, each such layer consisting of at least one elemental conductor of a thickness related to the equivalent thickness due to skin effect, and insulating material between successive layers, each individual layer having at least one line of insulating means along the direction of the elemental conductor, the average radius of said composite of said layers being large with respect to the total thickness of all said layers the helical pitch of said layers decreasing from the inside outwardly approximately in inverse proportion to the square of the distance from the innermost layer to provide substantially equal effective inductive impedances for each layer, said stranded conductor being designed independently of the dielectric constant and permeability of the medium outside the conductor.

2. A high frequency stranded conductor according to claim 1 further comprising at least one layer of magnetic material interposed between said core and the innermost layer consisting of at least one elemental conductor.

3. A high frequency stranded conductor according to claim 1, wherein the thickness of the elemental conductors of the various layers are different.

4. A high frequency stranded conductor according to claim 1, wherein the successive layers from the inside outwardly are of decreasing thickness.

5. A high frequency stranded conductor comprising a central core of insulating material, a plurality of concentric layers of helical elemental conductors forming a composite of layers, each such layer consisting of at least one elemental conductor of a thickness related to the equivalent thickness due to skin effect, and insulating material between successive layers, each individual layer having at least one line of insulating means along the direction of the elemental conductor, the average radius of said composite of said layers being large with respect to the total thickness of all said layers, the direction of twist of the elemental conductors reversing between some two adjacent layers, the helical pitch of said layers being the smaller, the farther the layer is from the adjacent layers where the direction of twist reverses in order to provide substantially equal effective inductive impedances for each layer, and said stranded conductor being designed independently of the dielectric constant and permeability of the medium outside the conductor.

6. A high frequency coaxial cable comprising a central core of insulating material, an inner conductor, an outer conductor and insulating material between these two conductors, in which said inner conductor comprises a plurality of concentric layers of helical elemental conductors forming a composite of layers, each such layer consisting of at least one elemental conductor of a thickness related to the equivalent thickness due to skin effect, and insulating material between successive layers, each individual layer having at least one line of insulating means along the direction of the elemental conductor, the average radius of said composite of said layers being large with respect to the total thickness of all said layers, and the helical pitch of said layers decreasing from the inside outwardly approximately in inverse proportion to the square of the distance from the innermost layer to provide substantially equal effective inductive impedances for each layer, and said inner conductor being designed independently of the dielectric constant and permeability of the medium between the inner and outer conductors.

7. A high frequency coaxial cable according to claim 6, in which the outer conductor comprises a plurality of concentric layers of helical elemental conductors forming a second composite of layers, each such layer consisting of at least one elemental conductor of a thickness related to the equivalent thickness due to skin effect, and insulating material between successive layers, each individual layer having at least one line of insulating means along the direction of the elemental conductor, the average radius of said second composite of said layers being large with respect to the total thickness of all said layers and the helical pitch of said layers decreasing from the outside inwardly approximately in inverse proportion to the square of the distance from the outermost layer in order to provide substantially equal effective inductive impedances for each layer, and said outer conductor being designed independently of the dielectric constant and permeability of the medium between the inner and outer conductors.

8. A high frequency cable comprising a central core of insulating material, a plurality of concentric layers of helical elemental conductors forming a composite of layers, each such layer consisting of at least one elemental conductor of a thickness related to the equivalent thickness due to skin effect, and insulating material between successive layers, each individual layer having at least one line of insulating means along the direction of the elemental conductor, the average radius of said composite of said layers being large with respect to the total thickness of all said layers, the helical pitch of said layers decreasing from the inside outwardly approximately in inverse proportion to the square of the distance from the innermost layer in order to provide substantially equal effective inductive impedances for each layer, and the said cable being designed without respect to the dielectric constant and permeability of the medium outside of the cable.

9. A high frequency cable comprising a central core of insulating material, a plurality of concentric layers of helical elemental conductors forming a composite of layers, each such layer consisting of at least one elemental conductor of a thickness related to the equivalent thickness due to skin effect, and insulating material between successive layers, each individual layer having at least one line of insulating means along the direction of said elemental conductor, the average radius of the composite of said layers being large with respect to the total thickness of all said layers, the direction of twist of the elemental conductors reversing between two adjacent layers, the helical pitch of said layers being the smaller, the farther the layer is from the adjacent layers where the direction of twist reverses in order to provide substantially equal effective inductive impedances for each layer, said cable being designed independently of the dielectric constant and permeability of the medium outside of the cable.

10. A high frequency stranded conductor comprising a plurality of layers each consisting of one or more elemental conductors, insulating means between the respective layers, the elemental conductor or conductors of the respective layers comprising helical turns insulated from one another and having different pitches determined by the formula $$P_m = 2\pi \sqrt{\frac{r_0^3}{3t}} \cdot \frac{\sqrt{n(n^2-1)}}{m(m-1)}$$

where $P_m$ is the pitch of the $m$th layer from the inside, $r_0$ is the average radius of the layers, $t$ is the thickness of the elemental conductor and $n$ is the total number of layers, with the approximate condition that $$nt \ll r_0 \text{ and } t < \frac{0.7\vartheta}{\sqrt{n}}$$

where $\vartheta$ is the equivalent thickness of an elemental strip conductor due to skin effect whereby the effective inductance due to the self-inductance of the elemental conductors and their mutual inductance is substantially equalized at the different layers.

11. A high frequency stranded conductor according to claim 10 further comprising a central core of insulating material.

12. A high frequency stranded conductor according to claim 10 further comprising a central core of insulating material and at least one layer of magnetic material interposed between said core and the innermost layer of elemental conductors.

13. A high frequency conductor according to claim 10 further comprising a central core of insulating material, in which each of said plurality of layers comprises stranded elemental wires of circular cross-section, and a thread of insulating material stranded with the elemental wires of each said layer of wires.

14. A high frequency conductor according to claim 10 further comprising a central core of insulating material wherein each of said plurality of layers comprises stranded insulated elemental conducting tapes.

15. A high frequency conductor according to claim 10 further comprising a central core of insulating material, wherein each of said plurality of conducting layers comprises a single conducting tape, and insulating means between the adjacent edges of the tapes comprising each layer.

16. A high frequency conductor according to claim 15 further comprising at least one layer of magnetic material interposed between said core and the first layer of conducting tape.

17. A high frequency cable according to claim 15 comprising two conducting layers the twist of the conductor of one layer being reversed with respect to the other and the pitch of both having substantially the same value.

18. A high frequency coaxial cable according to claim 10 further comprising core of insulating material, a further plurality of layers of elemental conductors wound over said first plurality of layers with progressively increasing pitch towards the outside of the cable and a layer of insulating material interposed between said two pluralities of layers.

19. A high frequency stranded conductor according to claim 10, wherein the successive layers from the inside outwardly are of decreasing thickness.

20. A high frequency cable comprising a central core of insulating material, a plurality of conducting layers each comprising one or more helical stranded elemental conductors, successive turns of said conductors being insulated from one another, insulating means interposed between the respective layers, the pitch of the conductors of the respective layers progressively varying from the inside of the cable according to the formula $$P_m = 2\pi \sqrt{\frac{r_0^3}{3t} \cdot \frac{\sqrt{n(n^2-1)}}{m(m-1)}}$$

where $P_m$ is the pitch of the mth layer from the center, $r_0$ is the average radius of the layers, $t$ is the thickness of the elemental conductor and $n$ is the total number of layers, with the approximate condition that $$nt \ll r_0 \text{ and } t < \frac{0.7\vartheta}{\sqrt{n}}$$

where $\theta$ is the equivalent thickness of an elemental strip conductor due to skin effect, whereby the effective inductance due to the self-inductance of the elemental conductors and their mutual inductance is substantially equalized at the different layers.

21. A high frequency cable according to claim 20 in which the direction of twist of the elemental conductors reverses as between two adjacent layers.

References Cited in the file of this patent
UNITED STATES PATENTS
2,769,149     Kreer  ------------------ Oct. 30, 1956

OTHER REFERENCES

Manley: A Three-Conductor Elementary Clogston Coaxial Transmission Line—Calculation, Fabrication and Experiment, The Bell System Technical Journal, vol. XLII, November 1963, No. 6, page 2552 cited.

Reference Data for Radio Engineers, page 128, Stratford Press Inc., New York, copyright 1956.